US012170685B2

(12) United States Patent
Manor et al.

(10) Patent No.: US 12,170,685 B2
(45) Date of Patent: Dec. 17, 2024

(54) MULTI-DIMENSIONAL RISK ASSESMENT, REPORTING, AND MITIGATION FOR COMPUTATIONAL AND COMMUNICATION SYSTEMS

(71) Applicant: Microsoft Technology Licensing, LLC, Redmond, WA (US)

(72) Inventors: Omri Manor, Tel Aviv-Jaffa (IL); Michael Shlomo Navat, Tel Aviv-Jaffa (IL); Yoel Benharrous, Rishon LeZion (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 327 days.

(21) Appl. No.: 17/703,895

(22) Filed: Mar. 24, 2022

(65) Prior Publication Data
US 2023/0308468 A1 Sep. 28, 2023

(51) Int. Cl.
*H04L 9/40* (2022.01)
(52) U.S. Cl.
CPC ........ *H04L 63/1433* (2013.01); *H04L 63/101* (2013.01); *H04L 63/104* (2013.01); *H04L 63/1425* (2013.01)
(58) Field of Classification Search
CPC ............. H04L 63/1433; H04L 63/1425; H04L 63/104; H04L 63/101
See application file for complete search history.

(56) References Cited

U.S. PATENT DOCUMENTS

| | | | |
|---|---|---|---|
| 8,762,188 B2 | 6/2014 | Abercrombie et al. | |
| 9,680,938 B1* | 6/2017 | Gil | H04L 67/142 |
| 10,193,923 B2 | 1/2019 | Wright et al. | |
| 10,592,938 B2 | 3/2020 | Hogg et al. | |
| 2001/0027389 A1* | 10/2001 | Beverina | G06Q 50/26 703/22 |
| 2010/0125911 A1 | 5/2010 | Bhaskaran et al. | |
| 2014/0173738 A1* | 6/2014 | Condry | G06F 21/577 726/25 |
| 2014/0257918 A1 | 9/2014 | Spencer et al. | |

(Continued)

FOREIGN PATENT DOCUMENTS

EP   3528462 A1   8/2019

OTHER PUBLICATIONS

NPL Search Terms (Year: 2024).*

(Continued)

*Primary Examiner* — Syed A Zaidi
(74) *Attorney, Agent, or Firm* — Shook, Hardy & Bacon L.L.P.

(57) ABSTRACT

Computational/communication system security tools are provided. Such tools report at least one multi-dimensional (or multi-component) data-object (based on the monitored events) to an administrator of the system. The multiple components of the data object provide multiple risk indicators (e.g., risk scores) along various dimensions of security for such systems. Thus, tools provide multi-dimensional monitoring and reporting of risks and security threats to computational/communication systems. The tools may also provide at least one risk mitigation action (e.g., quarantining and/or prohibiting particular risky entities, entity groups, and/or entity activities) based on the enhanced monitoring and detection methods presented herein.

20 Claims, 6 Drawing Sheets

(56) References Cited

U.S. PATENT DOCUMENTS

| | | | | |
|---|---|---|---|---|
| 2014/0324519 | A1* | 10/2014 | Dennis | G06Q 10/0635 |
| | | | | 705/7.28 |
| 2016/0021117 | A1* | 1/2016 | Harmon | H04L 63/20 |
| | | | | 726/1 |
| 2016/0226905 | A1* | 8/2016 | Baikalov | H04L 63/1433 |
| 2017/0034023 | A1* | 2/2017 | Nickolov | H04L 43/0817 |
| 2017/0332238 | A1 | 11/2017 | Bansal et al. | |
| 2018/0004948 | A1* | 1/2018 | Martin | H04L 63/1425 |
| 2018/0219891 | A1 | 8/2018 | Jain | |
| 2019/0044963 | A1* | 2/2019 | Rajasekharan | G06N 20/00 |
| 2021/0406365 | A1 | 12/2021 | Neil et al. | |

OTHER PUBLICATIONS

"Practical Guidelines for Conducting IEC 62443 Assessments using Radiflow Products", Retrieved From: https://radiflow.com/wp-content/uploads/WP-62443-compliance-051120.pdf, Retrieved on: Sep. 30, 2022, 7 Pages.

"Ranking Threats by Decreasing Risk", Retrieved From: https://learn.microsoft.com/en-us/previous-versions/commerce-server/ee823900(v=cs.20), Nov. 12, 2009, 1 Page.

Brandon, "Business Intelligence and Reporting", Retrieved From: https://www.teramind.co/features/business-Intelligence-reporting, Retrieved on: Sep. 30, 2022, 5 Pages.

Dudorov, et al., "Probability Analysis of Cyber Attack Paths against Business and Commercial Enterprise Systems", In Proceedings of European Intelligence and Security Informatics Conference, Aug. 12, 2013, pp. 38-44.

Khullar, et al., "AI and ML in Cybersecurity Risk Management", Retrieved From: https://www.infosys.com/iki/perspectives/cybersecurity-risk-management.html, Dec. 1, 2020, 21 Pages.

In, Derek, "A User and Entity Behavior Analytics Scoring System Explained", Retrieved From: https://www.exabeam.com/ueba/user-entity-behavior-analytics-scoring-system-explained/, Jan. 20, 2017, 6 Pages.

"Accurately Calculate Cyber Risk With the Threat Category Risk Framework", Retrieved from: https://www.recordedfuture.com/threat-category-risk-framework, May 27, 2020, 7 Pages.

"CISA National Cyber Incident Scoring System (NCISS)", Retrieved from: https://www.cisa.gov/news-events/news/cisa-national-cyber-incident-scoring-system-nciss, Sep. 30, 2020, 15 Pages.

"Common Vulnerability Scoring System version 3.1: Specification Document", Retrieved from: https://www.first.org/cvss/specification-document, Jun. 2019, 28 Pages.

"Common Weakness Scoring System (CWSS™)", Retrieved from: https://cwe.mitre.org/cwss/cwss_v1.0.1.html, Sep. 5, 2014, 24 Pages.

"CVE Vulnerability", Retrieved from: https://www.imperva.com/learn/application-security/cve-cvss-vulnerability/, Retrieved Date: Nov. 1, 2021, 6 Pages.

"How machine learning can help secure your business", Retrieved from: https://download.manageengine.com/log-management/user-and-entity-behavior-analytics-guide.pdf, Retrieved Date: Nov. 1, 2023, 16 Pages.

"National Vulnerability Database", Retrieved from: https://nvd.nist.gov/, Retrieved Date: Nov. 1, 2021, 02 Pages.

"NIST Cyber Risk Scoring (CRS)", Retrieved from: https://csrc.nist.gov/CSRC/media/Presentations/nist-cyber-risk-scoring-crs-program-overview/images-media/NIST%20Cyber%20Risk%20Scoring%20(CRS)%20-%20Program%20Overview.pdf, Feb. 2021, 38 Pages.

Wallen, Jack, "How does the CVE scoring system work?", Retrieved from: https://www.techrepublic.com/article/how-does-the-cve-scoring-system-work/, Jun. 27, 2019, 5 Pages.

"Systems Engineering Innovation Center", Retrieved from: https://www.mitre.org/our-impact/mitre-labs/systems-engineering-innovation-center, Retrieved Date: Nov. 1, 2021, 2023, 5 Pages.

"The STRIDE Threat Model", Retrieved from: https://learn.microsoft.com/en-us/previous-versions/commerce-server/ee823878(v=cs.20), Nov. 12, 2009, 2 Pages.

Geib, et al., "Getting started with the Threat Modeling Tool", Retrieved from: https://learn.microsoft.com/en-us/azure/security/develop/threat-modeling-tool-getting-started, Aug. 25, 2022, 9 Pages.

"International Search Report and Written Opinion Issued in PCT Application No. PCT/US2023/010905", Mailed Date: May 12, 2023, 12 Pages.

Shevchenko, Nataliya, "Threat Modeling: 12 Available Methods", Retrieved from: https://insights.sei.cmu.edu/blog/threat-modeling-12-available-methods/, Dec. 3, 2018, 16 Pages.

Sullivan, et al., "Microsoft Defender Vulnerability Management dashboard", Retrieved from: https://learn.microsoft.com/en-us/microsoft-365/security/defender-vulnerability-management/tvm-dashboard-insights?view=o365-worldwide, Sep. 15, 2023, 4 Pages.

* cited by examiner

MULTI-DIMENSIONAL RISK ASSESMENT, REPORTING, AND MITIGATION FOR COMPUTATIONAL AND COMMUNICATION SYSTEMS

BACKGROUND

Civilization continues to embrace the proliferation of computational devices and is actively striving for hyper-connectivity amongst its computational devices. As an example, the market growth for internet-of-things (IoT) devices, wearable devices, and software/cloud services have exhibited exponential growth for several years. Accordingly, much of the world's economy is operated, at least partially, within computational environments and communication networks, which commutatively couple computing devices. Because all computational and/or communication systems are subject to security risks (e.g., malicious attacks), security risks are a growing concern in many domains of human activity.

The market has responded to these growing security concerns via various security monitoring tools, which are widely available for computational and communication systems. Many such conventional security (or risk) tools determine a single risk score (e.g., a scalar value) that is based on multiple factors. These conventional tools provide the single risk score to a user, such as an administrator or security analyst for the computational/communication system. However, a scalar value (e.g., a risk score) that indicates an overall security threat to the system may not provide enough information for the administrator to ensure security of there system. For example, the scalar risk score may not provide the administrator insight into which entities (e.g., users or devices) of their system, which user activities, and/or which attack types provides the greatest (or least) security risk to their system. That is, a single risk score may not instruct an administrator on how to best secure their system. Accordingly, many computational/communication systems remain at risk, despite the best efforts of those tasked with securing such systems.

SUMMARY

Various aspects of the technology described herein are generally directed towards at least one method, system, and/or non-transitory computer readable storage media. In one exemplary, but non-limiting method embodiment, the method may include detecting a plurality of events associated with a computational/communication system. Each event of the plurality of events may be associated with at least one entity of a plurality of entities and at least one attack type of a plurality of attack types. For each event of the plurality of events, a plurality of risk scores may be determined. Each risk score of the plurality of risk scores may correspond to a separate attack type of the plurality of attack types. The plurality of risks scores for each event may be encoded in a first multidimensional (MD) data object. For each entity of the plurality of entities, an entity risk score may be determined based on the first MD data object. At least one high-risk entity of the plurality of entities may be identified. Identifying high-risk entities may be based on the entity risk score for each of the plurality of entities and at least one risk threshold. A risk report that includes an indication of the at least one high-risk entity may be generated and/or provided to a user.

In at least one embodiment, in response to identifying a high-risk entity and/or a high-risk entity group, a risk mitigation action may be automatically performed. In some embodiments, the risk mitigation action may affect an ability of the high-risk entity (or entities included in a high-risk entity group) to access the system in subsequent attempts to access the system. Such risk mitigation actions include, but are not limited to updating system access-permissions associated with the high-risk entity such that an ability of the high-risk entity to access the system in future attempts is limited to a smaller portion of the system than what was previously available to the entity prior to being identified as a high-risk entity. Other risk mitigation actions include, but are not limited to (permanently or temporarily) disabling (or suspending) a system account associated with the high-risk entity, or requiring (as a condition of subsequent access to the system) that the high-risk entity updates their account credentials (e.g., forcing a password reset event on the high-risk entity).

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The technology described herein is described in detail below with reference to the attached drawing figures, wherein.

DETAILED DESCRIPTION

Figure 1:
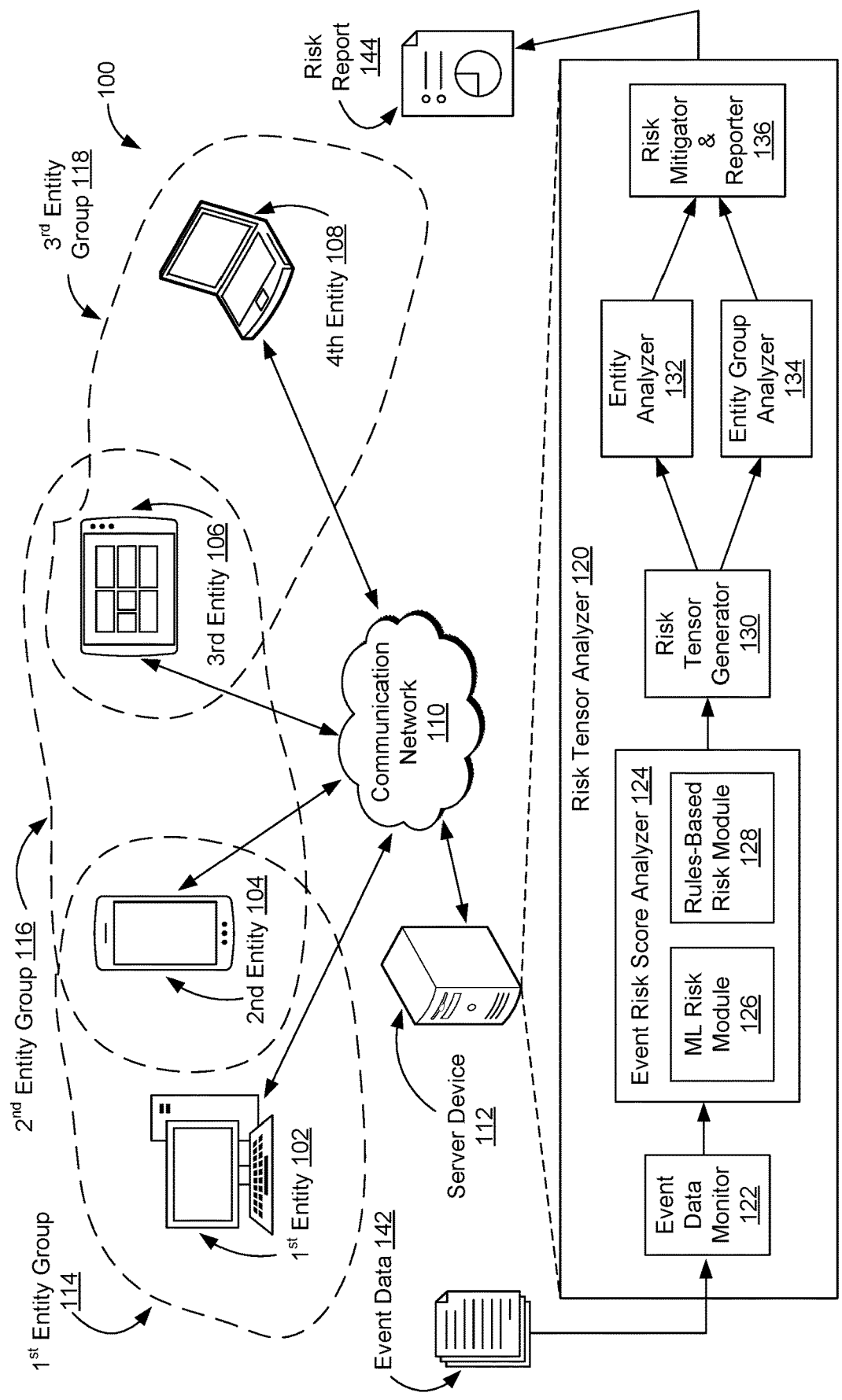
FIG. 1 includes a block diagram showing an operating environment, in which some embodiments of the present disclosure may be employed.

Overview of Technical Problems, Technical Solutions, and Technological Improvements Many conventional security and/or risk monitoring tools for computational and/or communication systems fail to provide a user with sufficient information regarding the nature of risks to their systems. For instance, a scalar risk score may not encode critical information such as, which entities (e.g., users and/or devices), which user activities (e.g., user logins, user downloads, adding new software packages/libraries to the system, and the like), or which attack types (ransomware, password spraying, and the like) pose the greatest risks their systems. Without such information, an administrator and/or security analyst of a computational/communication system may not be adequately informed as to the severity, characteristics, and nature of the risks to their system. As such, by employing conventional security tools, an administrator may not have sufficient information as to how to best protect their systems from security threats.

To such ends, the embodiments herein are directed towards providing enhanced security and risk monitoring/ mitigation tools. The enhanced security tools discussed herein provide greater insight into the severity, characteristics, and nature of the risks to computational/communication systems. The enhanced tools monitor activity (e.g., events) occurring within a computational/communication system. Rather than providing a scalar risk score, as conventional tools often do, the enhanced tools report at least one multi-dimensional (or multi-component) data-object (based on the monitored events) to an administrator of the system. The multiple components of the data object may provide multiple risk indicators (e.g., risk scores) along various dimensions of security for such systems. Thus, the embodiments provide multi-dimensional monitoring and reporting of risks and security threats to computational/communication systems. The enhanced tools may also provide at least one risk mitigation action (e.g., quarantining and/or prohibiting particular risky entities, entity groups, and/or entity activities) based on the enhanced monitoring and detection methods presented herein.

Components of a computational/communication system, which are enabled to perform at least one action, may be referred to as an "entity" of the system. Entities include, but are not limited to computing devices connected to the system, users of such computing devices, and the like. Entities may include (physical or virtualized) hardware such as client computing devices, server computing devices, network devices, storage devices, and the like. Entities may include any object capable of executing at least one action, such as but not limited to software components, hardware components, and/or a combination thereof. A unique identifier, a fingerprint, and/or some other unique signature may be assigned to and identify each entity.

A discrete detectable action of an entity may be referred to as an "entity action," or simply an "event." Events (or entity activity) may include, but are not otherwise limited to user login events, a new (physical or virtual) device being connected to a network, a user downloading at least one file, at least one new software application and/or libraries being added to a device, and the like. Within a system (associated with at least one organization), entities may be grouped into at least one entity group. A single entity may belong to at least one entity group. Some entities may not belong to an entity group. Each entity and/or entity group of the system may be associated with at least one organization with access to the computational/communications system.

The various embodiments monitor entity activity (e.g., events) occurring within a computational/communications systems. As previously stated, the system's entities may be associated with at least one entity group and each entity group may be associated with at least one organization (e.g., a company, a governmental agency, or the like). For each event detected in the system (or at least a subset of the detected events), at least one risk score may be determined. Each discrete risk score determined for an event may correspond to a separate attack type and/or attack scenario (ransomware, password spraying, and the like). The risk scores determined for an event may be accumulated, arranged, and/or encoded in a multi-component (or multi-dimensional) data object. A value of each component of the multi-component data object is set to a separate risk score of the at least one risk score determined for the event. That is, each component (or dimension) of the data object for the event corresponds to a specific attack type. The value of the component indicates a risk assessment (e.g., a risk score) associated with the corresponding attack type. In various embodiments, the multi-component object in which the event's various risk scores are encoded in may be a risk vector, 1D array, and/or an n-tuple. The dimension of the vector, 1D array, and/or n-tuple may be N, where N is a positive integer that corresponds to the number of possible attack types.

The object encoding the at least one risk score for a discrete event may be referred to as an "attack type risk vector" (or simply the attack type vector), since its components include risk scores for the various attack types. Each event's attack type risk vector may be employed to provide insight and understanding into the severity, characteristics, and nature of the risks to an organization (e.g., a collection of entities and/or entity groups). The attack type vectors are combined in various combinations to provide an enhanced risk report that indicates which attack types, entity activities (e.g., event types), entities, and entity groups (and in what relative proportions) are contributing to the total risk to an organization. Thus, in contrast to conventional security tools that provide a scalar risk score, the embodiments provide a risk report that provides multi-dimensional insight into the nature of the risks, what attack types are most common (or provide the greatest risk), which entity activities are the riskiest, and which entities/entity groups provide the greatest risk to the organization (or system).

More specifically, for each event detected within a computational/communication system, N separate risks scores are determined. Each of the N risk scores indicates a risk (for the event) associated with a separate attack type. The risk scores are encoded in an attack type risk vector for the event. Risk vectors (for multiple events) may be accumulated into a higher-order data structures (e.g., a multi-dimensional array and/or a higher rank tensor). The higher-order data structure may be referred to as a "risk tensor" or a "risk array." The risk tensor is analyzed to identify the riskiest attack types to an organization. The risk tensor may be analyzed to identify the riskiest entity (for each attack type) to the organization. The risk tensor may be analyzed to identify the riskiest attack types (for each entity) to the organization. Each of these risk assessments (and others) may be provided to a user (e.g., an administrator) in an enhanced risk report. At least one risk mitigation action may be undertaken (e.g., automatically or manually), in view of the multi-dimensional risk assessments. Because the risk monitoring and mitigation performed by the various embodiments is implemented via the generation and analysis of risk tensors and/or risk vectors, the enhanced security tools discussed herein may be implemented by a risk tensor analyzer (e.g., risk tensor analyzer 120 of FIG. 1).

The multi-dimensional risk assessment provides various benefits over a scalar risk score. For example, the multi-dimensional risk assessment provides real-time insight into which attack type an organization is experiencing. Furthermore, the multi-dimensional risk assessment provides real-time insight into which of the organization's entities are under attack. Given a specific attack type and/or at-risk entity, an administrator (or security analyst) can look for data and signals (included in the enhanced risk report or a log of entity activity) that are common for the attack type. Accordingly, the response (e.g., risk mitigation actions) to various risks to the system may be more targeted and effective than those that are enabled by conventional security tools, which provide a scalar risk score.

As used herein, the terms "tensor" and "array" may be used interchangeably to refer to (multi-dimensional) data structures (e.g., a data object) that have at least one risk component. For example, the terms "3-tensor" and "3D array" may be used interchangeably to refer to a 3D data object that requires 3 indices to refer to a specific component of the data object. The terms "2-tensor," "matrix," and "2D array" may be used interchangeably to refer to a 2D data object that requires 2 indices to refer to a specific component of the data object. The terms "1-tensor," "vector," "1D array," and "n-tuple" may be used interchangeably to refer to a 1D data object that requires 1 index to refer to a specific component of the data object. The terms "0-tensor" and "scalar" may refer to a zero-dimensional data object that includes only a single component, and thus no indices are required to refer to the data object's single component. Note that the employment of terms, such as "tensor," "matrix," "vector," and "scalar" to refer to various data objects does not imply that the components of these data objects need to transform by conventional covariant and contravariant transformation laws. For example, the "proper length" of a vector (as determined by a metric tensor) or the value of a scaler need not be frame invariant.

Overview of Environments for Multi-Dimensional Risk Monitoring & Mitigation

Aspects of the technical solution can be described by way of examples and with reference to FIG. 1 and additional illustrations below. FIG. 1 includes a block diagram showing an operating environment 100, in which some embodiments of the present disclosure may be employed. It should be understood that this and other arrangements described herein are set forth only as examples. Other arrangements and elements (e.g., machines, interfaces, functions, orders, and groupings of functions) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by an entity may be carried out by hardware, firmware, and/or software. For instance, some functions may be carried out by a processor executing instructions stored in memory.

Among the components explicitly shown in FIG. 1, operating environment 100 includes multiple "entities." As used herein, the term "entity" may refer to and/or include (but is otherwise not limited to): a physical and/or virtualized computing device, a user of a computing device, a cluster of computing devices, a system, a sub-system, a communication networks, a sub-network, a shared (software) library, an executable application, an executable script, or any other instance that may be identified by a set of operations that a computing device is enabled to execute. A unique identifier, a fingerprint, and/or some other unique signature may identify each entity. The entities shown in FIG. 1 are computing devices, each of which may have at least one user, which may also be entities. Note that other entity types may be included in environment 100.

The entities shown in FIG. 1 include, but are not limited to, first entity 102, second entity 104, third entity 106, and fourth entity 108. These entities all include at least one computing device, as well as at least one user. As noted above, other entities and/or entity types may be included in environment 100. The entities shown in FIG. 1 may be at least a subset of the entities associated with an organization (e.g., a company, a governmental agency, a non-profit, a residence, a commercial building, or the like). Within an organization, entities may be arranged into at least one entity group. An entity may be included in at least one entity group. In some embodiments, an entity may not be included in at least a single entity group. At least a subset of the entity groups for the organization are shown in FIG. 1. For example, environment 100 includes a first entity group 114, a second entity group 116, and third entity group 118. The first entity group 114 includes first entity 102 and second entity 104. The second entity group 116 includes the second entity 104 and the third entity 106. The third entity group includes the third entity 106 and the fourth entity 108. Accordingly, the second entity 104 and the third entity 106 are each included in multiple entity groups. Note that the arrangement of entities into entity groups in FIG. 1 is for illustrative purposes only. Thus, environment 100 may include fewer or more entity and/or entity types. Environment 100 may include fewer or more entity groups. Each entity group may include fewer or more entities. Environment 100 may also include a server computing device 112.

The entities and the server computing device 112 may be communicatively coupled via a communications network 110. Communication network 110 may be a general or specific communication network and may directly and/or indirectly communicatively coupled to client computing device 102 and server computing device 104. Communication network 110 may be any communication network, including virtually any wired and/or wireless communication technologies, wired and/or wireless communication protocols, and the like. Communication network 110 may be virtually any communication network that communicatively couples a plurality of computing devices and storage devices in such a way as to computing devices to exchange information via communication network 110. Accordingly, the environment 100 may be said to include a computational and/or communications system.

The server computing device 112 may implement a risk tensor analyzer 120. The risk tensor analyzer 120 is generally responsible for implementing aspects of the various embodiments. That is, risk tensor analyzer 120 is generally responsible for detecting events occurring within the computational/communication system included in environment 100. The detectable events may be encoded in event data 142. Event data 142 may include a real-time stream of events (e.g., entity activity), a log of events occurring within environment 100, or a combination thereof. For each event detected within a computational/communication system of environment 100, the risk tensor analyzer 120 may determine N separate risks scores, where N is a positive integer. Each of the N risk scores indicates a risk (for the event) associated with a separate attack type. The risk scores are encoded in an attack type risk vector for the event. Risk tensor analyzer 120 may accumulate risk vectors (for multiple events) into a higher-order data structures (e.g., a multi-dimensional array and/or a higher rank tensor). The higher-order data structure may be referred to as a "risk tensor" or a "risk array." The risk tensor analyzer 120 may analyze the risk tensor to identify the riskiest attack types to an organization. The risk tensor analyzer 120 may further analyze the risk tensor to identify the riskiest entity and/or entity group (e.g., for each attack type) to the organization. The risk tensor analyzer 120 may further analyze the risk tensor to identify the riskiest attack types (e.g., for each entity and/or entity group) to the organization. The risk tensor analyzer 120 may provide each of these risk assessments (and other risk metrics) to a user (e.g., an administrator and/or a security analyst) in an enhanced risk report (e.g., risk report 144). The risk tensor analyzer 120 may implement at least one risk mitigation action (e.g., quarantining data, executable code, devices, users, and/or other entities), in view of the multi-dimensional risk assessments.

Risk tensor analyzer 120 may be operated in a real-time mode or an offline mode. When operated in a real-time mode, risk tensor analyzer 120 may monitor entity activity and detect/report/mitigate system risks in real-time (or at least near real-time). When operated in the real-time mode, event data 142, which serves as an input to the risk tensor analyzer 120, may include a real-time stream of entity-initiated events. When operated in offline mode, the risk tensor analyzer 120 may analyze system risks based on previously generate event data. That is, event data 142 may include a log of events that were previously generated. Thus, event data 142 may include archived and/or previously stored entity activity data (e.g., entity data). To perform various security tasks discussed herein, risk tensor analyzer 120 may include an event data monitor 122, an event risk score analyzer 124, and a risk tensor generator 130. In various embodiments, the risk tensor analyzer 120 may additionally include an entity analyzer 132, an entity group analyzer 134, and a risk mitigator and reporter 136.

As shown in FIG. 1, event data monitor 122 may receive the event data 122 as input. Event data monitor 122 may analyze the event data (in real-time or in an offline mode) to detect events. For each of the events detected by event data monitor 122, event risk score analyzer 124 is generally responsible for determining the N separate risk scores for the event. The event score analyzer 124 may employ various machine learning (ML) methods to determine at least a subset of the N risk scores. In some embodiments, the event score analyzer 124 may employ various rules-based (e.g., heuristics) to determine at least another subset of the N risk scores. As such, the event score analyzer 124 may include a ML risk module 126, which is generally responsible for calculating risks scores via ML methods, and a rules-based module 128, which is generally responsible for calculating risk scores via rules-based methods. The risk tensor generator 130 is generally responsible for encoding the N separate risk scores in at least risk tensor and/or risk vectors, as discussed herein. The entity analyzer 132 is generally responsible for analyzing the risk tensors and/or risk vectors generated by the risk tensor generator 130, at the level of attack types for each entity. More specifically, the entity analyzer 132 may identify high-risk entities in the organization. The entity analyzer 132 may also identify high-risk attack types for each high-risk entity in the organization. The entity group analyzer 134 is generally responsible for analyzing the risk tensors and/or risk vectors generated by the risk tensor generator 130, to identify high-risk attack types for each entity group. The entity group analyzer 134 may also identify high-risk entities for each high-risk attack type for each entity group. The risk mitigator and reporter 136 is generally responsible for generating the enhanced risk report 144 and providing the risk report 144 to a user of the system (e.g., an administrator or security analyst). The risk mitigator and reporter 136 may additionally perform at least risk mitigation if at least risk level (as indicated in the risk report 144) exceeds at least one threshold value for a corresponding risk. It should be understood that environment 100 shown in FIG. 1 is an example of one suitable operating environment. Each of the components shown in FIG. 1 may be implemented via any type of computing device, such as computing device 500 described in connection to FIG. 5, for example. These components may communicate with each other via network 110, which may include, without limitation, a local area network (LAN) and/or a wide area networks (WAN). In exemplary implementations, communications network 110 comprises the Internet and/or a cellular network, amongst any of a variety of possible public and/or private networks. Operating environment 100 can be utilized to implement any of the various embodiments described herein. For instance, operating environment 100 also be utilized for implementing various aspects described in conjunction with FIGS. 2-4B.

Overview of Multi-Dimensional Risk Assessment, Reporting, and Mitigation

Figure 2:
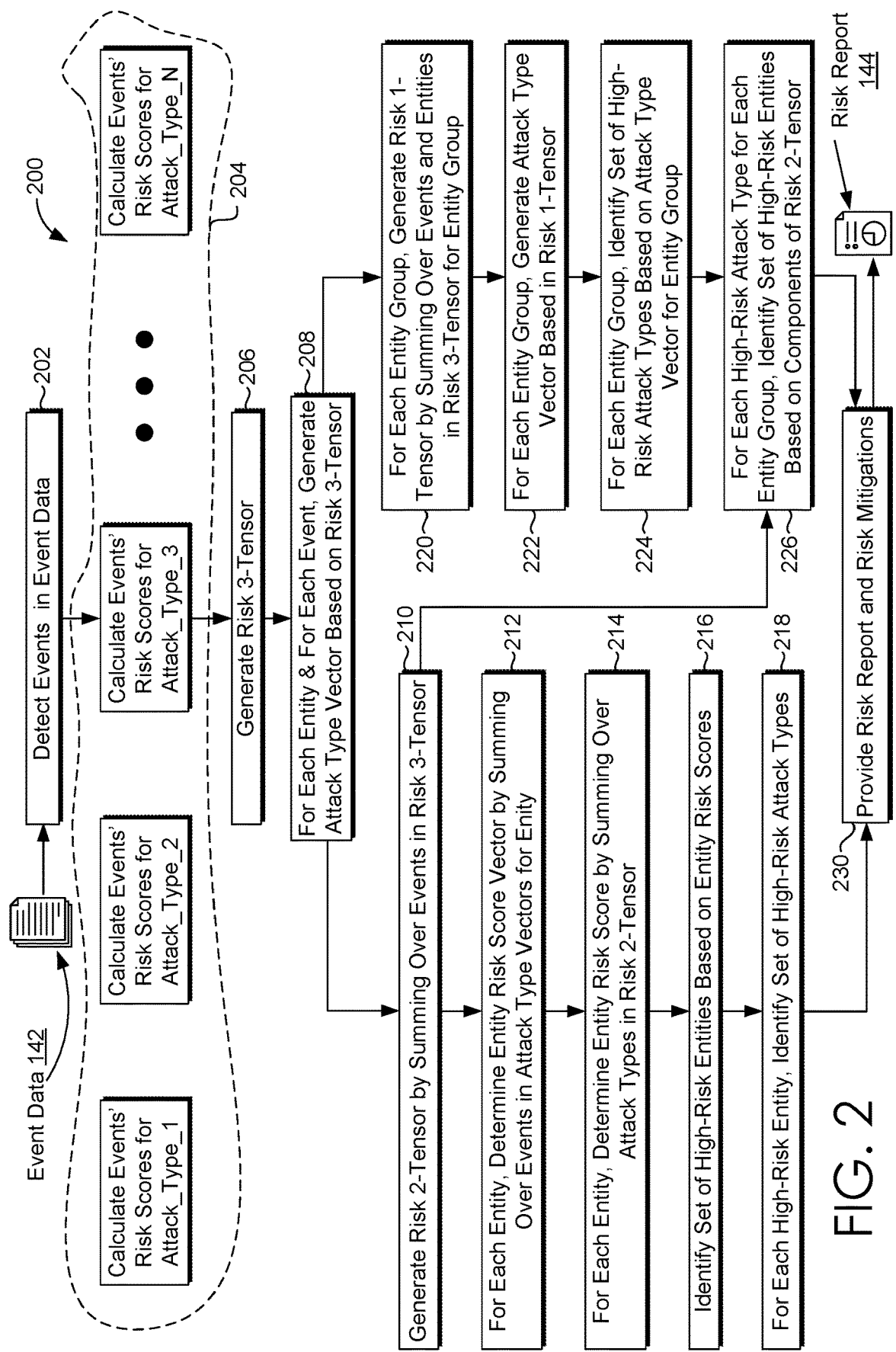
FIG. 2 illustrates a block diagram showing an example multi-dimensional risk assessment, reporting, and mitigation process, implemented by various embodiments.

FIG. 2 illustrates a block diagram showing an example multi-dimensional risk assessment, reporting, and mitigation process 200, implemented by various embodiments. A risk tensor analyzer (e.g., risk tensor analyzer 120 of FIG. 1) may implement process 200. The risk tensor analyzer may perform process 200 in a real-time mode or an offline mode. Process 200 begins at step 202, where events are detected within the input event data 142. The input event data 142 may include a set of activities that various entities of a computational/communication system has performed and/or initiated. The entities may be associated with at least one organization. Each entity may be associated with at least one entity group. Each entity group may be associated with at least one organization. The event data 142 may be in the form of activity logs, real-time events, time series, or the like. Events may include, but are not otherwise limited to user (e.g., an entity) logging onto the organization's communication network, a new device (e.g., an entity) being added to the network, an entity downloading a file from a server, a software package (e.g., an application, script, or library) being added to a process performed by the system, and the like. An event data monitor (e.g., event data monitor 122 of FIG. 1) may detect each of the discrete events in the input event data.

At step 204, N separate risk scores are calculated for each detected event, where N is a positive integer. Each of the N separate risk scores may correspond to a separate attack type that the computational/communication system may be subject to. An event risk score analyzer (e.g., event risk score analyzer 124 of FIG. 1) may be employed to determine each of the N risk scores. As noted previously, in some embodiments, the event score analyzer may determine at least a portion of the N risk scores based on at least one rules-based method (e.g., heuristic-based methods). A rules-based risk module (e.g., rules-based risk module 128 of FIG. 1) may implement such rules-based methods. In some embodiments, the event score analyzer may determine at least a portion of the N risk scores based on at least one machine learning (ML)-based method (e.g., methods implemented by various neural network (NN) architectures, support vector machine (SVM) implement methods, reinforcement-learning (RL) based methods, decision trees, and the like). A machine learning risk module (e.g., ML risk module 126 of FIG. 1) may implement such ML-based methods.

Such rules-based methods for determining a risk score (for a specific attack type), may include a set of (manually or automatically) engineered rules. As a non-limiting example of one such rules-based method for determining a risk score (for a specific attack type), when an event includes a failed login attempt for a specific user, a risk score for that entity may be increased. An event that includes the failed login attempt may effect a risk score for various attack types including, but not limited to a password spray attack, a malware attack, and/or a man-in-the-middle attack. In some embodiments, the failed login attempt may result in a significant increase in the risk score corresponding to the attack type of password spray attack. The failed login attempt may result in a medium increase in the risk score corresponding to the attack type of malware attack. The failed login attempt may result in little to no increase in the risk score corresponding to the attack type of man-in-the-middle attack.

In various ML-based methods, at least one ML model may be trained with labeled training data. The training of a ML model may enable the ML model to predict risk scores based on entity activity and/or events. In some embodiments, N separate ML models may be trained, one for each attack type. Each of the N ML models may be trained with labeled training data that is specific to a particular attack type. In other embodiments, a multi-label ML model (e.g., a multi-label classifier model) may be trained. The multi-label classifier model may include N separate labels, corresponding to the N attack types. In some embodiments, a separate risk score is determine for each event, for each attack type, and each entity, using at least one rules-based method, at least one ML-based method, and/or a combination thereof.

At step 206, the various risk scores (for the various events) may be accumulated in a risk tensor (or a risk array). The risk tensor (or risk array) may be a 3-tensor (or 3D array). Accordingly, the data object generated at step 206 may be referred to as a risk 3-tensor. A risk tensor generator (e.g., risk tensor generator 130 of FIG. 1) may generate the risk 3-tensor (or 3D array). In some non-limiting embodiments, the 3D array (or risk 3-tensor) may be referenced as: $s_{i,j,u}$, where the i-index is an index over the entities, the j-index is an index over the N attack types, and the u-index is an index over entities of the organization. Thus, the values for the components of the risk 3-tensor (generated at step 206) include risk scores determined for a specific event (e.g., as indicated by the i index), for a specific attack type (e.g., as indicated by the j index), and for a specific entity (e.g., as indicated by the u index). That is, the risk scores for the specific event, attack type, and specific entity (as indicated by the i, j, and u indices) are encoded in the risk 3-tensor (e.g., $s_{i,j,u}$).

At step 208, for each detected event and for each entity of the system, an attack type vector (or an attack type 1D array) may be generated for each detected event. The risk tensor generator may generate the attack type risk vector. The dimensionality of the attack type vector/array is N. Each component of the attack type vector/array (for a particular event (indexed by the i-index) and a particular entity (indexed by the u-index)) may correspond to and/or encode one of the N risks scores for the various attack types. The attack type vector/array may be referenced as: $\vec{s}_{i,u} = (s_{i,1,u}, s_{i,2,u}, s_{i,3,u}, \ldots, s_{i,N,u})$. Thus, an attack type risk vector/array (for the ith event and the uth entity) may correspond to a "1D-slice" of the risk 3-tensor (e.g., $s_{i,j,u}$), along the jth index. Thus, the values for the components of the attack type vector (for a specific event and a specific entity) include risk scores for each of the N attack types, where the specific event and specific entity are indicated by the i and u indices respectively (e.g., $\vec{s}_{i,u}$). It should be noted that the risk 3-tensor and attack type vectors are in contrast to conventional security tools that provide a single risk scalar to assess the risk to a system.

As a non-limiting example, consider three attack types (e.g., process injection, credential stuffing, and spearphishing), a third detected event (e.g., i=3), and a fourth entity (u=4). The three risks scores computed at step 204 may be 5 for the process injection attack type, 6 for the credential stuffing attack type, and 7 for the spearphising attack type). The corresponding attack type risk vector/array would be notated as: $\vec{s}_{3,4} = (5,6,7)$.

As shown in FIG. 2, after step 208, process 200 may split into two parallel sub-processes. The first sub-process of process 200 is illustrated on the left-hand side of FIG. 2, and includes steps 210-218. The second sub-process of process 200 is illustrated on the right-hand side of FIG. 2, and includes steps 220-226. The first and second sub-processes may be performed in parallel or serially. The only constraint in the order of operations is that step 210 may be performed prior to the performance of step 226, because step 226 requires, as inputs, at least a portion of the outputs of step 210. The first sub-process is primarily directed towards identifying high-risk entities, and high-risk attack types for each high-risk entity. As such, the steps of the first sub-process (e.g., steps 210-218) may be generally performed by an entity analyzer (e.g., entity analyzer 132 of FIG. 1). The second sub-process is primarily directed towards determining for each entity group, high-risk attack types and high-risk entities for each high-risk attack type. As such, the steps of the second sub-process (e.g., steps 220-226) may be generally performed by an entity group analyzer (e.g., entity group analyzer 134 of FIG. 1).

The discussion will first focus on the first sub-process, which as noted above may be generally implemented by an entity analyzer. At step 210, a risk 2-tensor is generated by summing over the events in the risk 3-tensor. More specifically, the risk 2-tensor generated at step 210 may be notated as: $r_{j,u}$ and its components may be calculated as: $r_{j,u} = \Sigma_i s_{i,j,u}$. Thus, the values for the components of the risk 2-tensor (generated at step 210) include risk scores summed over events, for a specific attack type and for a specific entity, where the specific event and specific entity are indicated by the j and u indices respectively (e.g., $r_{j,u}$). Various steps of process 200 may include at least one summation of the components associated with at least one index of a tensor. Note that a summation of an index of a tensor may be analogous to an index-contraction operation employed in tensor analysis methods. Thus, when an index is summed over, a new tensor may be generated. For example, when an index is summed over a 2-tensor, the resulting object may be a 1-tensor.

At step 212, a risk score vector (e.g., a 1-tensor) may be generated for each entity by summing over the events in the risk 2-tensor (generated at step 210), e.g., an index-contraction operation. The risk vector for the uth entity may be referenced as: Ty. Because the risk vector is for (or associated with) a particular entity, the vector generated at step 212 may be referred to an entity risk vector. The components of the entity risk vector for the uth entity may be calculated from the risk 2-tensor (or from the risk 3-tensor) as: $\vec{r}_u = (r_{1,u}, r_{2,u}, r_{3,u}, \ldots, r_{M,u}) = (\Sigma_i s_{i,1,u}, \Sigma_i s_{i,2,u}, \Sigma_i s_{i,3,u}, \ldots, \Sigma_i s_{i,N,u})$, where M is a positive integer that indicates the total number of detected events. Thus, the values for the components of the entity risk vector for the uth entity include a 1D slice of the risk 2-tensor along a particular value of u corresponding to the uth entity.

At step 214, for each entity, an entity risk score is calculated by summing over the attack types in the risk 2-tensor. The entity risk score (for each entity) may be encoded in a 1-tensor (e.g., a vector/1D array) referenced and calculated as: $t_u = \Sigma_j r_{j,u}$, where u is the index for the entities. Note that the entity risk score (for a particular entity) includes a sum over the risk scores of the N attack types. Because the 1-tensor $t_u$ encodes the entity risk scores, the $t_u$ may be referred to as an entity risk 1-tensor.

At step 216, a set of high-risk entities is identified based on ranking the entities by their corresponding entity risk scores (e.g., the components of the entity risk 1-tensor $t_u$ computed at step 214). Note that steps 216, 218, 224, and 226 of process 200 are each directed towards identifying a set of high-risk entities and/or a set of high-risk attack types from data encoded in various tensors and/or arrays. A set of high-risk entities and/or attack types may be generated by ranking and filtering the components of the tensor being analyzed to identify the set. Ranking components of a tensor may be performed by numerically ranking the values (e.g., risk scores and/or sums of risk scores) encoded in the components of the corresponding tensor (or sub-tensor). The ranking of the components may be encoded in a ranked list. The list may be filtered via at least one absolute or relative threshold. Thus, as described in more detail below, at step 216, a ranked list of high-risk entities may be generated from ranking and filtering the entities by ranking and filtering the components of the entity risk 1-tensor $t_u$. More generally, identifying a set of high-risk entities and/or high-risk attack types (e.g., at steps 216, 218, 224, and 226) may include generating a ranked list of high-risk entities and/or high-risk attack types. Such ranked lists may be generated by ranking and filtering (via at least one threshold filtering technique) the components of a tensor.

In step 216, a list of high-risk entities may be generating by ranking the set of high-risk entities by $t_u$. The list may be a ranked version of the set of high-risk entities, ranked by the components of $t_u$. In various embodiments, the list of high-risk entities may be truncated from the list of entities (e.g., ranked by the components of $t_u$) by at least one threshold. That is, the list of entities may be ranked and filtered by the values encoded in the components of $t_u$. For example, the list may include the 10% riskiest entities, the top 10 entities, or each of the entities, with a $t_u$ value exceeding at least one risk threshold. Thus, in some embodiments, the length of the list (or the cardinality of the set) of the riskiest entities may be a predetermined length. In other embodiments, the length of the list may vary depending on the total number of entities and the at least one threshold that are employed to distinguish the riskiest entities from the less risky entities.

At step 218, for each entity of the set of riskiest entities, a set of high-risk attack types are identified for the entity. For a given entity (as referenced by the u index), the N attack types may be ranked incrementally by the risk 2-tensor (e.g., $r_{j,u}=\Sigma_i s_{i,j,u}$, as computed in step 210). That is, for the uth entity, the N attack types may be ranked (and filtered) by varying the j index on the risk 2-tensor $r_{j,u}$, while holding the u index constant. Similarly to the set of riskiest entities, the cardinality set of the riskiest attack types (for a particular entity) may be constant or variable, depending on the threshold values and/or threshold types employed to distinguish the set of high-risk attack types from the set of all possible attack types. As shown in FIG. 2, after step 218, the first sub-process may terminate and merge with the second sub-process at step 230.

The discussion will now turn to the second sub-process, which as noted above, is generally directed towards analyzing the risk 3-tensor on the level of entity groups. As such, the second sub-process (e.g., steps 220-226) may be generally performed by an entity group analyzer (e.g., entity group analyzer 134 of FIG. 1). At step 220, for each entity group (e.g., within an organization), a risk 1-tensor is generated by summing the components of the risk 3-tensor (e.g., $s_{i,j,u}$) over the events and entities within the entity group being analyzed. The risk 1-tensor computed at step 220 may be referenced as $g_j$ and be computed as $g_j=\Sigma_u \Sigma_i s_{i,j,u}$, where the sum over the entities (e.g., over the u index) is performed for the entities included in the particular entity group being analyzed (e.g., this sum need not be over all the entities included in the organization, but only for those entities in the entity group). Thus, a risk 1-tensor is generated for each entity group, where each component of the risk 1-tensor corresponds to one of the N possible attack types. The component corresponding to a particular attack type includes the summation of risk scores over the events (summing over the i index) and over the entities in the entity group (summing over the u index for the entity group). In one non-limiting example, the third component of the risk 1-tensor (e.g., corresponding to the third attack type) for a particular entity group is referenced as $g_3$. At step 222, for each entity group, an attack type risk vector may be generated based on the risk 1-tensro for the entity group. The attack type risk vector for an entity group may be referenced as: $\vec{g}=(g_1, g_2, g_3, \ldots, g_N)$.

At step 224, for each entity group, a set of high-risk attack types may be identified based on the attack type risk vector for the entity group. The set of high-risk attack types for the entity group may be generated by ranking the components of the attack type risk vector. For example, for a particular entity group, the components of $g_j$ may be as follows: 400 for the component corresponding to a process injection attack type, 300 for the component corresponding to the credential shuffling attack type, and 500 for the component corresponding to the spearphishing link attack type. A ranked list of attack types may be generated by ranking the components of the risk 1-tensor (or the attack type risk vector) for the entity group. In this example, the ranking of the attack types for the particular entity group would be: spearphishing link, process injection, and credential shuffling. Similar to steps 216 and 218, the cardinality of the set (or length of the ranked list) of high-risk attack types for the entity group may be constant or vary, depending on the at least one threshold that employed to define the set and/or ranked list.

At step 226, for each high-risk attack type (e.g., the attack types included in the set of high-risk attack types identified in step 224) and for each entity group, a set of high-risk entities is identified based on the components of the risk 2-tensor computed in step 210 (e.g., $r_{j,u}=\Sigma_i s_{i,j,u}$). The components of the risk 2-tensor may be ranked and filtered to identify the set of the high-risk entities, for each high-risk attack type for each entity group. Again, the cardinality of the set (or ranked list) of high-risk entities for the high-risk attack types may vary depending on the at least one threshold employed. FIG. 2 shows the risk 2-tensor outputted in step 210 and provided as input to step 226. In some embodiments, for each high-risk attack type, the entities (e.g., entities associated with the entity group) may be ranked based on the components of the risk 2-tensor $r_{j,u}$. A thresholded-filter may be applied to the ranked list of entities. For instance, the entities riskiest 10% entities may be identified for each high-risk attack type.

At step 230, a risk report may be generated. The risk report may include indications of any of the information that was determined, via process 200 (e.g., by analyzing the risk 3-tensor). The report may be provided to a user (e.g., a system administrator and/or security analyst). In various embodiments, at least one risk mitigation action may be automatically implemented by the risk tensor analyzer. That is, based on the high-risk attack types, the risk tensor analyzer may automatically apply a pre-defined mitigation steps on the high-risk entities and/or entity groups. For example, in case of where the attack type password spray is a high-risk attack type for at least one entity and/or entity group, the risk mitigation action may require high-risk entities to reset their password. In various embodiments, a risk mitigator and reports (e.g., risk mitigation and reporter 136 of FIG. 1) may implement various operations of step 230. In various embodiments, the risk report may be risk report 144 of FIG. 1.

Figure 3:
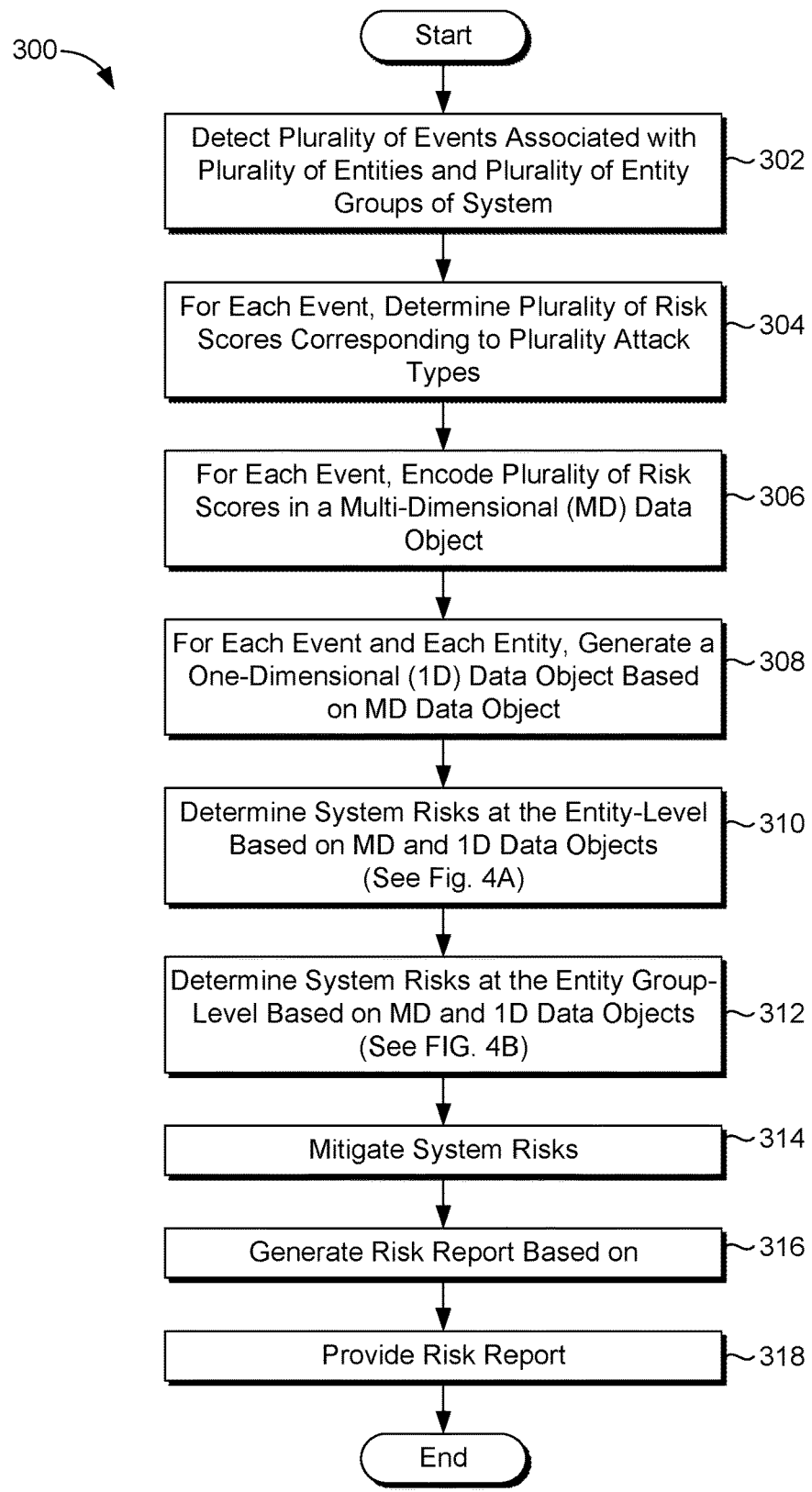
FIG. 3 provides a flow diagram that illustrates a method for multi-dimensional risk assessment, reporting, and mitigation for computational and communication systems.
Figure 4A:
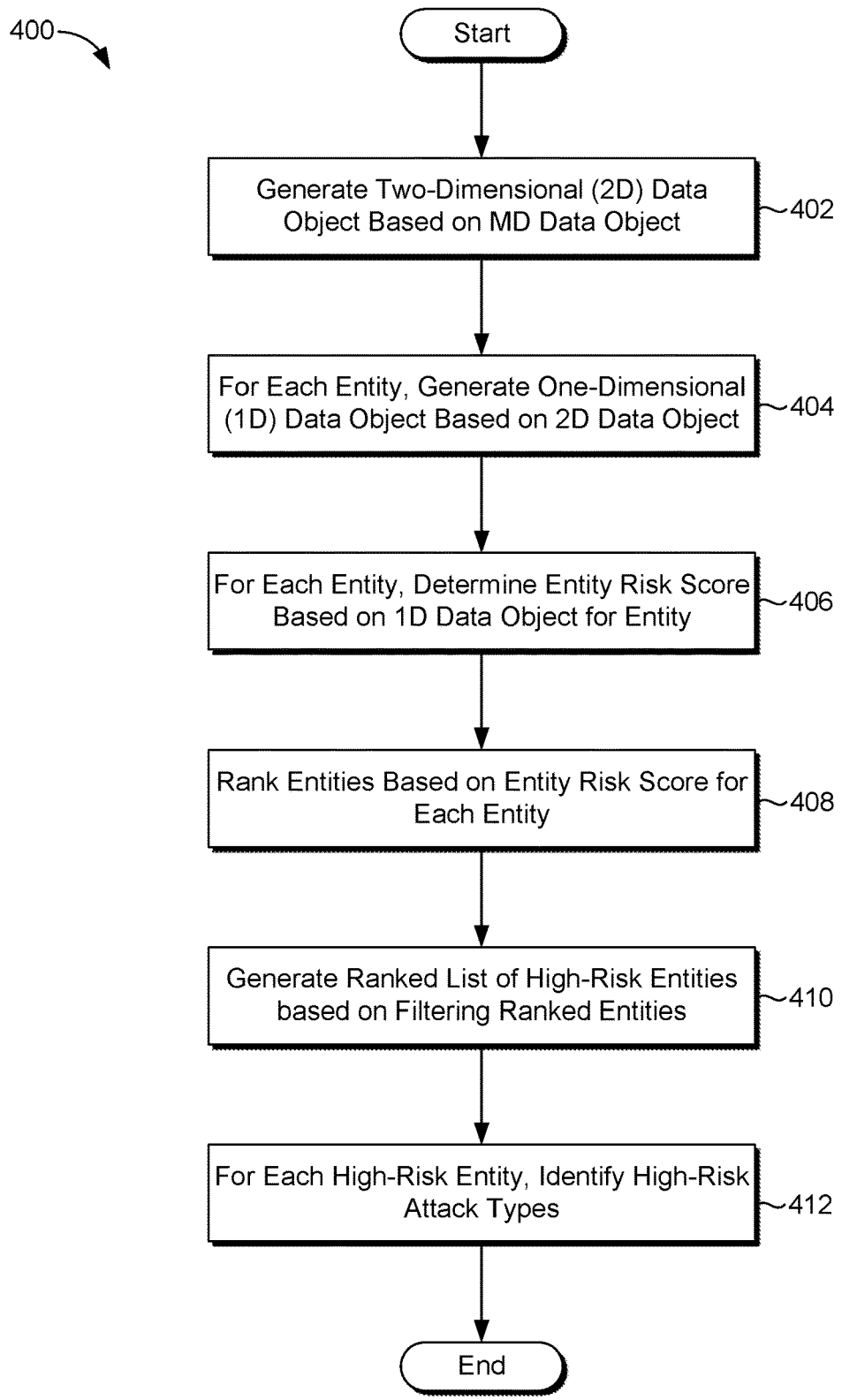
FIG. 4A provides a flow diagram that illustrates a method for determining system risks at the entity-level, in accordance with various embodiments.
Figure 4B:
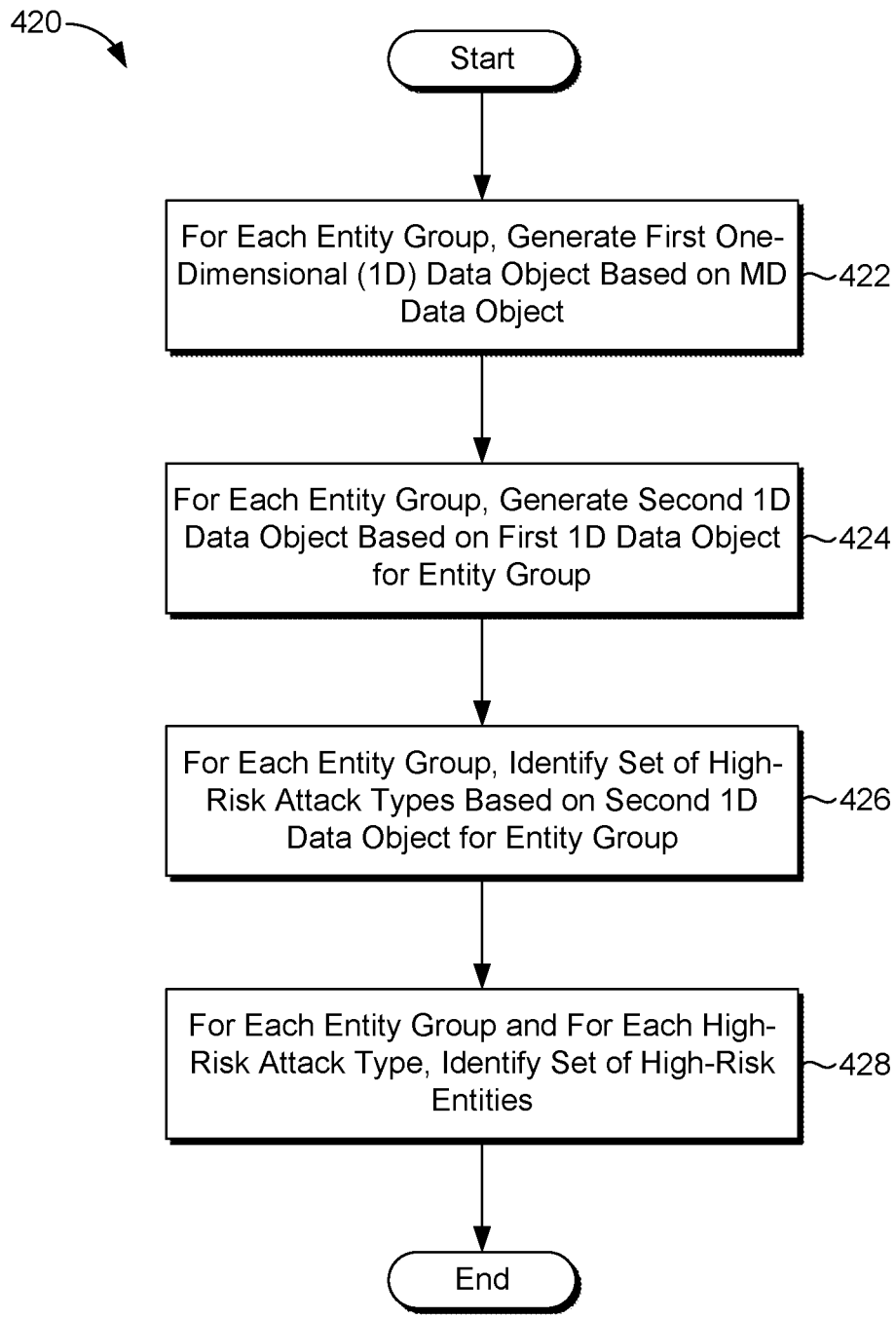
FIG. 4B provides a flow diagram that illustrates a method for determining system risks at the entity group-level, in accordance with various embodiments.

Example Methods for Multi-Dimensional Risk Monitoring and Mitigation for Systems With reference to FIGS. 3-4B, flow diagrams are provided illustrating methods for multi-dimensional risk assessment, reporting, and mitigation for computational and communication systems. The methods may be performed using any of the embodiments of a described herein. For example, a risk tensor analyzer (e.g., risk tensor analyzer 120 of FIG. 1) may implement at least a portion of the methods and/or actions discussed in the context of FIGS. 3-4B. In embodiments, at least one computer storage media having computer-executable instructions embodied thereon that, when executed, by at least one processor can cause the at least one processor to perform the methods in the storage system.

Turning to FIG. 3, a flow diagram is provided that illustrates a method 300 for multi-dimensional risk assessment, reporting, and mitigation for computational and communication systems. Generally, the flow diagram of FIG. 3 can be implemented using the architectures described above at least in conjunction with FIGS. 1-2. For example, any suitable combination of portions of method 300 may be implemented by risk tensor analyzer 120 of FIG. 1.

Initially, method 300 begins at block 302, were a plurality of events are detected. The events may be detected in a real-time mode or an offline mode operation of the risk tensor analyzer. The events may be associated with a plurality of entities and a plurality of entity groups of a computational/communication system and/or an organization employing the system. An event data monitor (e.g., event data monitor 122 of FIG. 1) may be employed to detect the events. When detecting events, the event data monitor may employ any of the actions and/or operations discussed at least in conjunction with step 202 of process 200 of FIG. 2.

At block 304, for each event of the plurality of events, a plurality of risk scores may be determined and/or computed. Each risk score may correspond to an attack type of a plurality of attack types that the system may be subject to. An event score analyzer (e.g., event score analyzer 124 of FIG. 1) may be employed to determine the plurality of risk scores. As such, at least a portion of the risk scores may be determined by at least one machine learning (ML)-based method. A ML risk module (e.g., ML risk module 126 of FIG. 1) may be employed to perform to perform such ML-based methods. In some embodiments, at least a portion of the risk scores may be determined by at least one rules-based method. A rules-based risk module (e.g., rules-based risk module 128 of FIG. 1) may be employed to perform to perform such rules-based methods. When determining risk scores, the event risk score analyzer may employ any of the actions and/or operations discussed at least in conjunction with step 204 of process 200.

At block 306 and for each event, the plurality of risk scores are encoded in a multi-dimensional (MD) data object. In various embodiments, the MD data object may be a risk 3-tensor. In at least one embodiment, the MD data object may be the $s_{i,j,u}$ risk 3-tensor discussed above. As such, a risk tensor generator (e.g., risk tensor generator 130 of FIG. 1) may be employed to encode the risk scores in the MD data object. When encoding the risk scores in the MD data object, the risk tensor generator may employ any of the actions and/or operations discussed at least in conjunction with step 206 of process 200. At block 308, a one-dimensional (1D) data object is generated for each event and for each entity is generated based on the MD data object. The 1D data object may be the attack risk vector (e.g., $\vec{s}_{i,u}=(s_{i,1,u}, s_{i,2,u}, s_{i,3,u}, \ldots, s_{i,N,u})$) discussed above and may be generated risk tensor generator. When generating the 1D data object, the risk tensor generator may employ any of the actions and/or operations discussed at least in conjunction with step 208 of process 200.

At block 310, system risks may be determined at the entity-level based on the MD and 1D data objects. Various embodiments of determining system risks at the entity-level are discussed in conjunction with at least process 400 of FIG. 4A. However, briefly here, determining system risks at the entity-level may include any of the operations and/or actions discussed in conjunction with steps 210-218 of process 200. Accordingly, an entity analyzer (e.g., entity analyzer 132 of FIG. 1) may implement actions and/or operations of block 310.

At block 312, system risks may be determined at the entity group-level based on the MD and 1D data objects. Various embodiments of determining system risks at the entity group-level are discussed in conjunction with at least process 420 of FIG. 4B. However, briefly here, determining system risks at the entity group-level may include any of the operations and/or actions discussed in conjunction with steps 220-226 of process 200. Accordingly, an entity group analyzer (e.g., entity group analyzer 134 of FIG. 1) may implement actions and/or operations of block 312.

At block 314, the system risks may be automatically and/or manually mitigated with at least one risk mitigation action. The risk mitigation action may be performed in response to identifying at least one high-risk entity, at least one high-risk attack type, and/or at least one high-risk entity group. For example, when a high-risk entity (or entity group) is identified, a risk mitigation action may be automatically performed, where the risk mitigation action is directed towards affecting an ability of the high-risk entity (or entities within the high-risk entity group) to access the system in the future. Such risk mitigation actions may include, but are not limited to updating system access permissions associated with the high-risk entity such that the ability of the high risk entity to access the system is decreased (e.g., the high-risk entity may be enabled to only access a small fraction of the system, compared to the portion of the system that the entity was able to access prior to being identified as a high-entity. Other risk mitigation actions include, but are not limited to disabling a system account associated with the high-risk entity or requiring, as a condition for subsequent access to the system, that the high-risk entity updated their account credentials (e.g., forcing a password reset). At block 316, a risk report (e.g., risk report 144 of FIG. 1) may be generated. At block 318, the risk report may be provided to a user (e.g., a system administrator and/or a security analyst). The operations and/or actions of blocks 314, 316, and 318 may be performed by a risk mitigator and reporter (e.g., risk mitigator and reporter 136 of FIG. 1). When performing risk mitigation and reporting, the risk mitigator and reporter may perform any of the actions and/or operations discussed in conjunction with at least step 230 of process 200.

FIG. 4A provides a flow diagram that illustrates a method 400 for determining system risks at the entity-level, in accordance with various embodiments. An entity analyzer (e.g., entity analyzer 132 of FIG. 1) may implement any portion of method 400. As such, when implementing method 400, the entity analyzer may perform any of the actions and/or operations discussed at least in conjunction with steps 210-210 of process 200 of FIG. 2.

Initially, method 400 begins at block 402, were a multi-dimensional (MD) data object may be generated based on the MD data object of block 306 of method 300 of FIG. 3. In some embodiments, the MD data object of block 402 may be a two-dimensional (2D) data object. In at least one embodiment, the 2D data object may be the risk 2-tensor discussed in conjunction with step 210 of process 200. Accordingly, the MD data object of block 402 may be $r_{j,u} = \Sigma_i s_{i,j,u}$, as discussed above. At block 404, for each entity, a one-dimensional (1D) data object is generated based on the 2D data object of block 402. In at least one embodiment, the 1D data object of block 404 may be the entity risk score vector as discussed in conjunction with step 212 of process 200. Accordingly, the 1D data object of block 404 may be $\vec{r}_u = (r_{1,u}, r_{2,u}, r_{3,u}, \ldots, r_{M,n}) = (\Sigma_i s_{i,1,u}, \Sigma_i s_{i,2,u}, \Sigma_i s_{i,3,u}, \ldots, \Sigma_i s_{i,N,u})$, as discussed above.

At step 406, for each entity, an entity risk score is determined. For an entity, the entity risk score may be based on the 1D data object for the entity (e.g., the 1D data object computed at block 404). The entity risk score for the entity may be encoded in a 1-tensor (e.g., a vector/1D array), $t_u = \Sigma_j r_{j,u}$, discussed in conjunction with at least step 214 of process 200. At block 408, the entities may be ranked based on the respective entity risk scores for each entity. At block 410, a ranked list of high-risk entities may be generated based on filtering the ranked entities. At such, blocks 408 and 410 may include the implementation of step 216 of process 200. Accordingly, the filtering and ranking of list of high-risk entities may include identifying a set of high-risk entities based on entity risk scores. At block 412, for each high-risk entity, at least one high-risk attack type is identified. Identifying the at least one high-risk attack type may include any of the operations and/or actions discussed in conjunction with at least step 218 of process 200.

FIG. 4B provides a flow diagram that illustrates a method 420 for determining system risks at the entity group-level, in accordance with various embodiments. An entity group analyzer (e.g., entity group analyzer 134 of FIG. 1) may implement any portion of method 420. As such, when implementing method 420, the entity analyzer may perform any of the actions and/or operations discussed at least in conjunction with steps 220-216 of process 200 of FIG. 2.

Initially, method 420 begins at block 422, were for each entity group, a first one-dimensional (1D) data object is generated based on the multi-dimensional (MD) data object of block 306 of method 300 of FIG. 3. The first 1D data object of block 422 may be the risk-tensor (e.g., $g_j = \Sigma_u \Sigma_i s_{i,j,u}$) discussed at least in conjunction with step 220 of process 200. At block 424, for each entity group, a second 1D data object may be generated based on the first 1D object for the entity group. In some embodiments, the second 1D data object of block 424 may be the attack type risk vector (e.g., a risk 1-tensor) discussed in conjunction with at least step 222 of process 200 (e.g., $\vec{g} = (g_1, g_2, g_3, \ldots, g_N)$).

At block 426, for each entity group, a set of high-risk attack types are determined based on the second 1D data object for the entity group. Identifying a set of high-risk attack types for an entity group is discussed at least in conjunction with step 224 of process 200. At block 428, for each entity group and for each high-risk attack type of the entity group, a set of high-risk entities is determined. Identifying a set of high-risk entities for an entity group and for a high-risk attack type is discussed at least in conjunction with step 226 of process 200.

OTHER EMBODIMENTS

The embodiments may be directed towards at least one of method, system, and/or non-transitory computer readable storage media. In one exemplary, but non-limiting method embodiment, the method may include detecting a plurality of events associated with a computational/communication system. Each event of the plurality of events may be associated with at least one entity of a plurality of entities and at least one attack type of a plurality of attack types. In some embodiments, a group or set of events is associated with an attack type. For instance, rather than a single event being associated with an attack type, a group of single events is associated with the attack type. For each event of the plurality of events, a plurality of risk scores may be determined. Each risk score of the plurality of risk scores may correspond to a separate attack type of the plurality of attack types. The plurality of risks scores for each event may be encoded in a first multidimensional (MD) data object. For each entity of the plurality of entities, an entity risk score may be determined based on the first MD data object. At least one high-risk entity of the plurality of entities may be identified. Identifying high-risk entities may be based on the entity risk score for each of the plurality of entities and at least one risk threshold. A risk report that includes an indication of the at least one high-risk entity may be generated and/or provided to a user.

In some embodiments, the method includes for each high-risk entity of the at least one high-risk entity, identifying at least one high-risk attack type of the plurality of attack types based on the first MD data object and the at least one risk threshold. An indication of the at least one high-risk attack type for each of the at least one high-risk entity may be included in the risk report.

Each entity of the plurality of entities may be associated with at least one entity group of a plurality of entity groups. In some embodiments, the method may include, for each entity group of the plurality of entity groups, identifying at least one high-risk attack type of the plurality of attack types. Identifying the at least one high-risk attack type for an entity group may be based on the first MD data object and the at least one risk threshold. An indication of the at least one high-risk attack type for each of the plurality of entity groups may be included in the risk report. In some embodiments, for each high-risk attack types of the at least one high-risk attack type of each entity group of the plurality of entity groups, at least one entity associated with the entity group that are high-risk entities for the high-risk attack type may be identified. An indication of the at least one entity associated with the entity group that are high-risk entities for the high-risk attack type may be included in the risk report.

In at least one embodiment, components of the first MD data object may encode the plurality of risk scores for each event of the plurality of events. The components of the first MD data object may be addressable by a first index that corresponds to the plurality of events, a second index corresponds to the plurality of attack types, and a third index that corresponds to the plurality of entities.

In some embodiments, a second MD data object may be generated. The second MD data object may be generated by performing summation operations over a dimension of the first MD data object that corresponds to the plurality of events such that the components of the second MD object encodes risk scores that are summed over the plurality of events. The second MD data object may have one less dimension that the first MD data object. For each entity of the plurality of entities, the entity risk score may be determined based on the second MD data object.

In various embodiments, for each entity of the plurality of entities, a one-dimensional (1D) data object may be generated. Generating the 1D data object for the entity may be based on the first MD data object. Each component of the 1D data object for the entity may correspond to one of the plurality of plurality of attack types. At least one high-risk attack type may be determined. Determining a high-risk attack type may be based on the 1D data object for each of the plurality of entities.

For some embodiments, at least a portion of the plurality of risk score for each of the plurality of events is determined by at least one machine learning (ML) method. In at least one embodiment, at least a portion of the plurality of risk score for each of the plurality of events is determined by at least one rules-based method.

The entity risk score for each of the plurality of entities may be encoded in components of a one-dimensional (1D) data object. The method may include ranking the entities of the plurality of entities based on the components of the 1D data object. The plurality of entities may be filtered based on the ranking of the plurality of entities and the at least one risk threshold. The at least one high-risk entity may be identified based on the filtered and ranked plurality of entities.

In at least one embodiment, in response to identifying a high-risk entity, a high-risk entity group, and/or a high-risk attack type, a risk mitigation action may be automatically performed. In some embodiments, the risk mitigation action may affect an ability of the high-risk entity (or entities included in a high-risk entity group) to access the system in subsequent attempts to access the system. Such risk mitigation actions include, but are not limited to updating system access-permissions associated with the high-risk entity such that an ability of the high-risk entity to access the system in future attempts is limited to a smaller portion of the system than what was previously available to the entity prior to being identified as a high-risk entity. Other risk mitigation actions include, but are not limited to (permanently or temporarily) disabling (or suspending) a system account associated with the high-risk entity, or requiring (as a condition of subsequent access to the system) that the high-risk entity updates their account credentials (e.g., forcing a password reset event on the high-risk entity).

Generalized Computing Device

Figure 5:
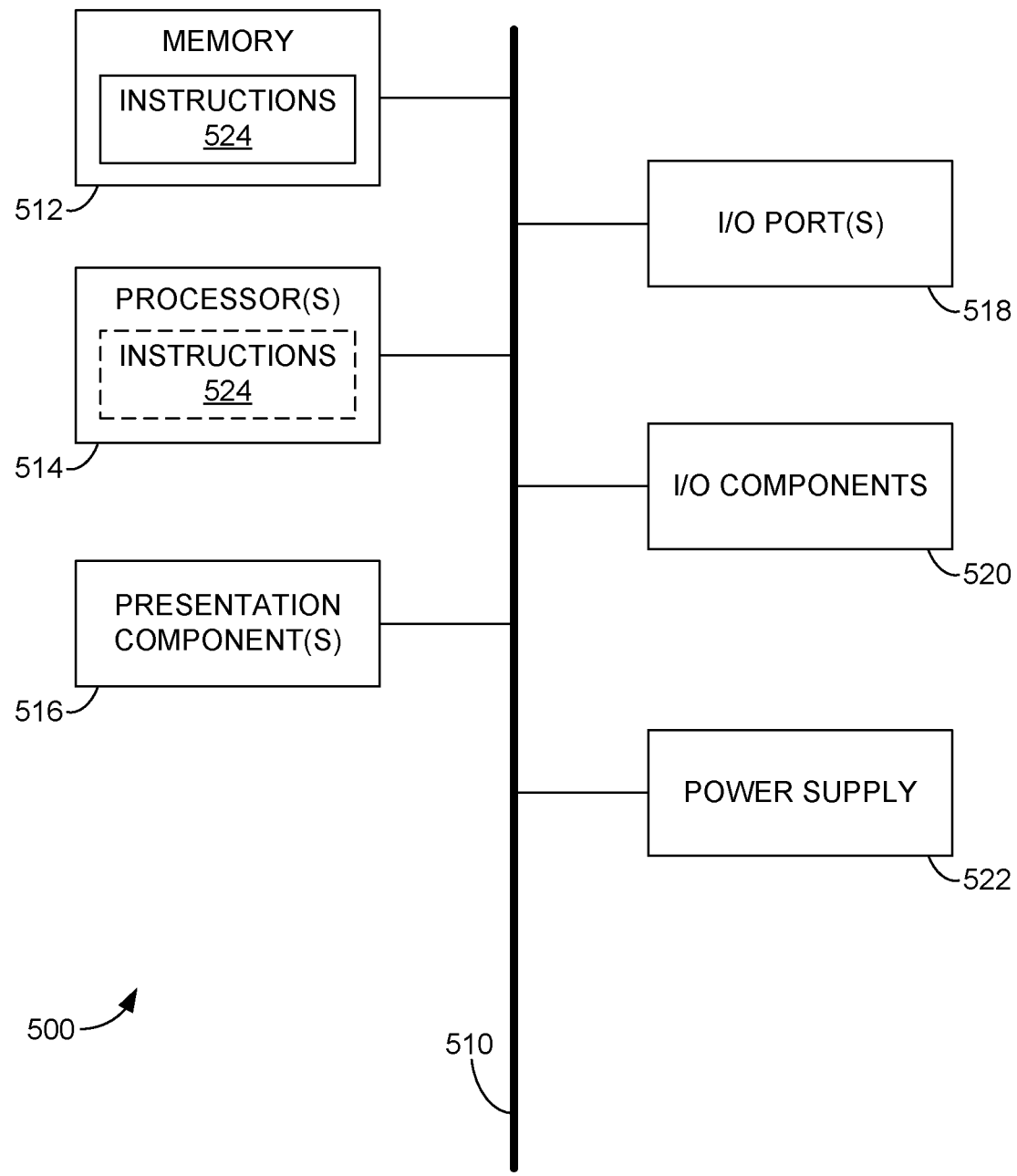
FIG. 5 is a block diagram of an exemplary computing environment suitable for use in implementing aspects of the technology described herein.

With reference to FIG. 5, computing device 500 includes a bus 510 that directly or indirectly couples the following devices: memory 512, at least one processor 514, at least one presentation component 516, at least one input/output (I/O) port 518, at least one I/O component 520, and an illustrative power supply 522. Bus 510 represents what may be at least one bus (such as an address bus, data bus, or combination thereof). Although the various blocks of FIG. 5 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art and reiterate that the diagram of FIG. 5 is merely illustrative of an exemplary computing device that can be used in connection with at least one embodiment of the present disclosure. Distinction is not made between such categories as "workstation," "server," "laptop," "handheld device," etc., as all are contemplated within the scope of FIG. 5 and with reference to "computing device."

Computing device 500 typically includes a variety of computer-readable media. Computer-readable media can be any available media that can be accessed by computing device 500 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 500. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has at least one of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 512 includes computer storage media in the form of volatile and/or nonvolatile memory. The memory may be removable, non-removable, or a combination thereof. Exemplary hardware devices include solid-state memory, hard drives, optical-disc drives, etc. Computing device 500 includes at least one processor 514 that read data from various entities such as memory 512 or I/O components 520. Presentation component(s) 516 presents data indications to a user or other device. In some implementations, presentation component 220 of system 200 may be embodied as a presentation component 516. Other examples of presentation components may include a display device, speaker, printing component, vibrating component, and the like.

The I/O ports 518 allow computing device 500 to be logically coupled to other devices, including I/O components 520, some of which may be built in. Illustrative components include a microphone, joystick, game pad, satellite dish, scanner, printer, wireless device, etc. The I/O components 520 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing device 500. The computing device 500 may be equipped with depth cameras, such as stereoscopic camera systems, infrared camera systems, RGB camera systems, and combinations of these, for gesture detection and recognition. Additionally, the computing device 500 may be equipped with accelerometers or gyroscopes that enable detection of motion. The output of the accelerometers or gyroscopes may be provided to the display of the computing device 500 to render immersive augmented reality or virtual reality.

Some embodiments of computing device 500 may include at least one radio 524 (or similar wireless communication components). The radio 524 transmits and receives radio or wireless communications. The computing device 500 may be a wireless terminal adapted to receive communications and media over various wireless networks. Computing device 500 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include, by way of example and not limitation, a Wi-Fi® connection to a device (e.g., mobile hotspot) that provides access to a wireless communications network, such as a WLAN connection using the 802.11 protocol; a Bluetooth connection to another computing device is a second example of a short-range connection, or a near-field communication connection. A long-range connection may include a connection using, by way of example and not limitation, at least one of CDMA, GPRS, GSM, TDMA, and 802.16 protocols.

Many different arrangements of the various components depicted, as well as components not shown, are possible without departing from the scope of the claims below. Embodiments of the disclosure have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

With reference to the technical solution environment described herein, embodiments described herein support the technical solution described herein. The components of the technical solution environment can be integrated components that include a hardware architecture and a software framework that support constraint computing and/or constraint querying functionality within a technical solution system. The hardware architecture refers to physical components and interrelationships thereof, and the software framework refers to software providing functionality that can be implemented with hardware embodied on a device.

The end-to-end software-based system can operate within the system components to operate computer hardware to provide system functionality. At a low level, hardware processors execute instructions selected from a machine language (also referred to as machine code or native) instruction set for a given processor. The processor recognizes the native instructions and performs corresponding low level functions relating, for example, to logic, control and memory operations. Low level software written in machine code can provide more complex functionality to higher levels of software. As used herein, computer-executable instructions includes any software, including low level software written in machine code, higher level software such as application software and any combination thereof. In this regard, the system components can manage resources and provide services for system functionality. Any other variations and combinations thereof are contemplated with embodiments of the present disclosure.

By way of example, the technical solution system can include an Application Programming Interface (API) library that includes specifications for routines, data structures, object classes, and variables may support the interaction between the hardware architecture of the device and the software framework of the technical solution system. These APIs include configuration specifications for the technical solution system such that the different components therein can communicate with each other in the technical solution system, as described herein.

Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by at least one entity may be carried out by hardware, firmware, and/or software, as described below. For instance, various functions may be carried out by a processor executing instructions stored in memory. As such, other arrangements and elements (e.g., machines, interfaces, functions, orders, and groupings of functions) can be used in addition to or instead of those shown.

Embodiments described in the paragraphs below may be combined with at least one of the specifically described alternatives. In particular, an embodiment that is claimed may contain a reference, in the alternative, to more than one other embodiment. The embodiment that is claimed may specify a further limitation of the subject matter claimed.

The subject matter of embodiments of the disclosure is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further the word "communicating" has the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where at least one feature is present. Also, the term "or" includes the conjunctive, the disjunctive, and both (a or b thus includes either a or b, as well as a and b).

For purposes of a detailed discussion above, embodiments of the present disclosure are described with reference to a distributed computing environment; however the distributed computing environment depicted herein is merely exemplary. Components can be configured for performing novel aspects of embodiments, where the term "configured for" can refer to "programmed to" perform particular tasks or implement particular abstract data types using code. Further, while embodiments of the present disclosure may generally refer to the technical solution environment and the schematics described herein, it is understood that the techniques described may be extended to other implementation contexts.

Embodiments of the present disclosure have been described in relation to particular embodiments which are intended in all respects to be illustrative rather than restrictive. Alternative embodiments will become apparent to those of ordinary skill in the art to which the present disclosure pertains without departing from its scope.

From the foregoing, it will be seen that this disclosure is one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

What is claimed is:

1. A computer-implemented method for assessing risk to a system, the method comprising:
    detecting a plurality of events associated with the system, wherein each event is associated with at least one entity of a plurality of entities and at least one attack type of a plurality of attack types;
    for each event of the plurality of events, determining a plurality of risk scores, wherein each risk score of the plurality of risk scores corresponds to a separate attack type of the plurality of attack types and the plurality of risk scores for each event are encoded in a first multi-dimensional (MD) data object, wherein the first MD data object includes a three dimensional tensor where risk scores of the plurality of risk scores are encoded based on an event of the plurality of events, an attack type of the plurality of attack types, and an entity of the plurality of entities such that a first component of the first MD data object includes a vector encoding a subset of the risk scores of the plurality of risk scores corresponding to attack types of the plurality of attack types;
    for each entity of the plurality of entities, determining an entity risk score based on the first MD data object by at least summing risk scores included in the first MD data object for a particular entity of the plurality of entities to generate a second MD data object of a lower dimension than the first MD data object;
    identifying at least one high-risk entity of the plurality of entities based on the entity risk score included in the second MD data object and at least one risk threshold; and
    providing a risk report that includes an indication of the at least one high-risk entity by at least providing multi-dimensional information associated with the at least one high-risk entity, where the multi-dimensional information includes information associated with the plurality of attack types, the plurality of events, and the plurality of entities.

2. The method of claim 1, further comprising:
    for each high-risk entity of the at least one high-risk entity, identifying at least one high-risk attack type of the plurality of attack types based on the first MD data object and the at least one risk threshold; and
    including in the risk report an indication of the at least one high-risk attack type for each of the at least one high-risk entity.

3. The method of claim 1, wherein each entity of the plurality of entities is associated with at least one entity group of a plurality of entity groups and the method further comprises:
    for each entity group of the plurality of entity groups, identifying at least one high-risk attack type of the plurality of attack types based on the first MD data object and the at least one risk threshold; and
    including in the risk report an indication of the at least one high-risk attack type for each of the plurality of entity groups.

4. The method of claim 3, further comprising;
    for each high-risk attack types of the at least one high-risk attack type of each entity group of the plurality of entity groups, identifying at least one entity associated with the entity group that are high-risk entities for the high-risk attack type; and
    including in the risk report an indication of the at least one entity associated with the entity group that are high-risk entities for the high-risk attack type.

5. The method of claim 1, wherein components of the first MD data object encode the plurality of risk scores for each event of the plurality of events and the components of the first MD data object are addressable by a first index that corresponds to the plurality of events, a second index corresponds to the plurality of attack types, and a third index that corresponds to the plurality of entities.

6. The method of claim 1, further comprising:
    generating a second MD data object by performing summation operations over a dimension of the first MD data object that corresponds to the plurality of events such that the components of the second MD object encodes risk scores that are summed over the plurality of events, wherein the second MD data object has one less dimension that the first MD data object; and
    for each entity of the plurality of entities, determining the entity risk score based on the second MD data object.

7. The method of claim 1, further comprising:
    for each entity of the plurality of entities, generating a one-dimensional (1D) data object based on the first MD data object, wherein each component of the 1D data object for the entity corresponds to one of the plurality of plurality of attack types; and
    determining at least one high-risk attack type based on the 1D data object for each of the plurality of entities.

8. The method of claim 1, wherein at least a portion of the plurality of risk score for each of the plurality of events is determined by at least one machine learning (ML) method.

9. The method of claim 1, wherein at least a portion of the plurality of risk score for each of the plurality of events is determined by at least one rules-based method.

10. The method of claim 1, wherein the entity risk score for each of the plurality of entities is encoded in components of a one-dimensional (1D) data object and the method further comprises:
ranking the entities of the plurality of entities based on the components of the 1D data object;
filtering the plurality of entities based on the ranking of the plurality of entities and the at least one risk threshold; and
identifying the at least one high-risk entity based on the filtered and ranked plurality of entities.

11. A system comprising:
at least one hardware processor; and
at least one computer-readable media having executable instructions embodied thereon, which, when executed by the at least one processor, cause the at least one hardware processor to execute actions for assessing risk to the system, the actions comprising:
detecting a plurality of events associated with the system, wherein each event is associated with at least one entity of a plurality of entities and at least one attack type of a plurality of attack types;
for each event of the plurality of events, determining a plurality of risk scores, wherein each risk score of the plurality of risk scores corresponds to a separate attack type of the plurality of attack types and the plurality of risks scores for each event are encoded in a first multidimensional (MD) data object, wherein the first MD data object includes a three dimensional tensor where risk scores of the plurality of risk scores are encoded based on an event of the plurality of events, an attack type of the plurality of attack types, and an entity of the plurality of entities such that a first component of the first MID data object includes a vector encoding a subset of the risk scores of the plurality of risk scores corresponding to attack types of the plurality of attack types;
for each entity of the plurality of entities, determining an entity risk score based on the first MD data object by at least summing risk scores included in the first MID data object for a particular entity of the plurality of entities to generate a second MD data object of a lower dimension than the first MD data object;
identifying at least one high-risk entity of the plurality of entities based on the entity risk score included in the second MD data object and at least one risk threshold; and
providing a risk report that includes an indication of the at least one high-risk entity by at least providing multi-dimensional information associated with the at least one high-risk entity, where the multi-dimensional information includes information associated with the plurality of attack types, the plurality of events, and the plurality of entities.

12. The system of claim 11, wherein the actions further comprises:
for each high-risk entity of the at least one high-risk entity, identifying at least one high-risk attack type of the plurality of attack types based on the first MD data object and the at least one risk threshold; and
including in the risk report an indication of the at least one high-risk attack type for each of the at least one high-risk entity.

13. The system of claim 11, wherein each entity of the plurality of entities is associated with at least one entity group of a plurality of entity groups and the actions further comprise:
for each entity group of the plurality of entity groups, identifying at least one high-risk attack type of the plurality of attack types based on the first MD data object and the at least one risk threshold; and
including in the risk report an indication of the at least one high-risk attack type for each of the plurality of entity groups.

14. The system of claim 13, wherein the actions further comprising:
for each high-risk attack types of the at least one high-risk attack type of each entity group of the plurality of entity groups, identifying at least one entity associated with the entity group that are high-risk entities for the high-risk attack type; and
including in the risk report an indication of the at least one entity associated with the entity group that are high-risk entities for the high-risk attack type.

15. The system of claim 11, wherein components of the first MD data object encode the plurality of risk scores for each event of the plurality of events and the components of the first MD data object are addressable by a first index that corresponds to the plurality of events, a second index corresponds to the plurality of attack types, and a third index that corresponds to the plurality of entities.

16. The system of claim 11, wherein the actions further comprise:
generating a second MD data object by performing summation operations over a dimension of the first MD data object that corresponds to the plurality of events such that the components of the second MD object encodes risk scores that are summed over the plurality of events, wherein the second MD data object has one less dimension that the first MD data object; and
for each entity of the plurality of entities, determining the entity risk score based on the second MD data object.

17. The system of claim 11, wherein the actions further comprise:
for each entity of the plurality of entities, generating a one-dimensional (1D) data object based on the first MD data object, wherein each component of the 1D data object for the entity corresponds to one of the plurality of plurality of attack types; and
determining at least one high-risk attack type based on the 1D data object for each of the plurality of entities.

18. At least one computer storage media storing computer-useable instructions for assessing risk to a system that, when the instructions are used by at least one computing device, cause the at least one computing device to perform actions comprising:
detecting a plurality of events associated with the system, wherein each event is associated with at least one entity of a plurality of entities and at least one attack type of a plurality of attack types;
for each event of the plurality of events, determining a plurality of risk scores, wherein each risk score of the plurality of risk scores corresponds to a separate attack type of the plurality of attack types and the plurality of risks scores for each event are encoded in a first multidimensional (MD) data object, wherein the first MD data object includes a three dimensional tensor where risk scores of the plurality of risk scores are encoded based on an event of the plurality of events, an attack type of the plurality of attack types, and an entity of the plurality of entities such that a first component of the first MD data object includes a vector encoding a subset of the risk scores of the plurality of risk scores corresponding to attack types of the plurality of attack types;

for each entity of the plurality of entities, determining an entity risk score based on the first MD data object by at least summing risk scores included in the first MD data object for a particular entity of the plurality of entities to generate a second MD data object of a lower dimension than the first MD data object;

identifying at least one high-risk entity of the plurality of entities based on the entity risk score included in the second MD data object and at least one risk threshold; and providing a risk report that includes an indication of the at least one high-risk entity by at least providing multi-dimensional information associated with the at least one high-risk entity, where the multi-dimensional information includes information associated with the plurality of attack types, the plurality of events, and the plurality of entities.

19. The media of claim 18, the actions further comprising:
in response to identifying the at least one high-risk entity, performing at least one risk mitigation action that affects an ability of the at least one high-risk entity to access the system.

20. The media of claim 19, wherein the at least one risk mitigation action includes at least one of:
updating system access-permissions associated with the at least one high-risk entity such that the ability of the at least one high-risk entity is decreased;
disabling a system account associated with the at least one high-risk entity; and
requiring, as a condition of subsequent access to the system, that the at least one high-risk entity updates account credentials.

* * * * *